Oct. 28, 1952     C. S. KELLEY     2,615,537
COMBINED BRAKE CYLINDER AND SLACK ADJUSTER
Filed May 21, 1949
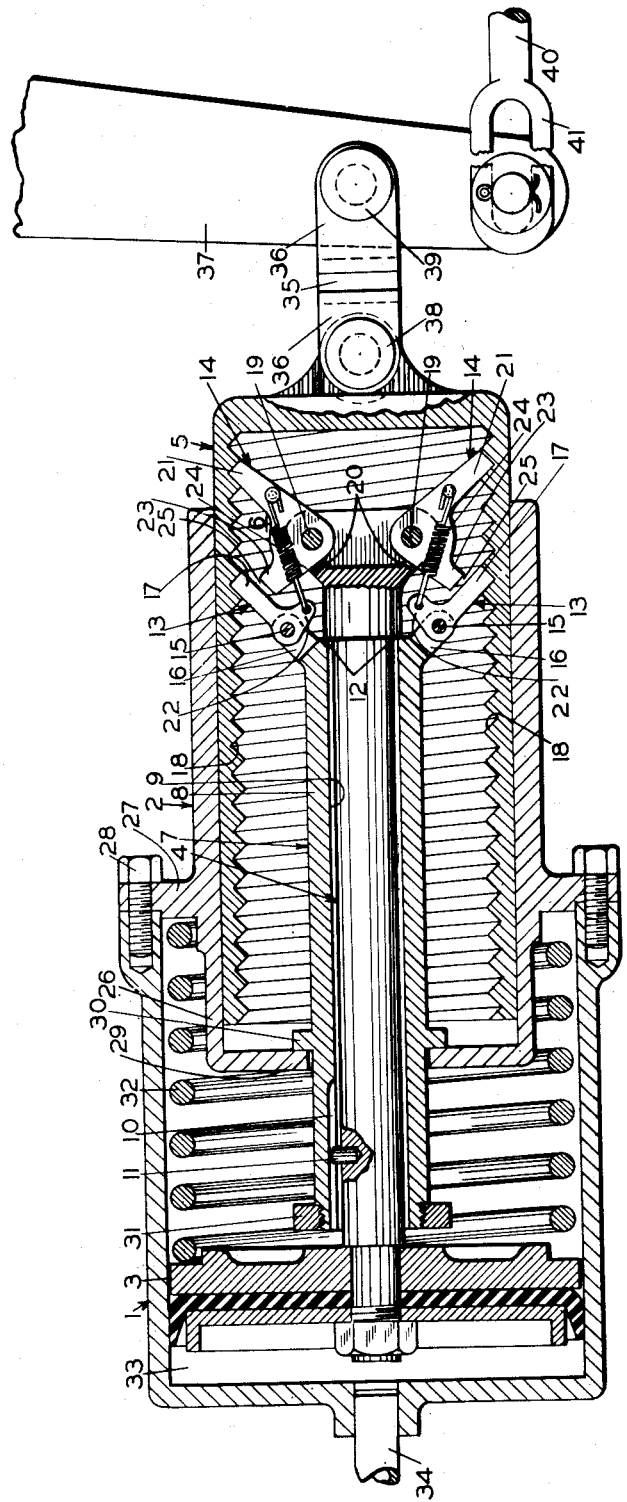
INVENTOR.
*Cecil S. Kelley*
BY
*Frank E. Miller,*
ATTORNEY Patented Oct. 28, 1952

2,615,537

UNITED STATES PATENT OFFICE 2,615,537

COMBINED BRAKE CYLINDER AND SLACK ADJUSTER

Cecil S. Kelley, Forest Hills, Pa., assignor to Westinghouse Air Brake Company, a corporation of Pennsylvania Application May 21, 1949, Serial No. 94,714

8 Claims. (Cl. 188—200)

This invention relates to combined brake cylinder and automatic slack adjuster devices and more particularly to the type for use in vehicle brake rigging.

One object of the invention is to provide an improved brake cylinder and slack adjuster device of the above type.

Another object of the invention is to provide a combined brake cylinder and slack adjuster device in which the slack adjuster is completely enclosed to protect it from freezing up due to becoming covered with snow and ice in the winter season, and to prevent dirt, grease and the like accumulating on the parts thereof which might interfere with proper operation.

Other objects and advantages will be apparent from the following more detailed description of the invention.

In the accompanying drawing; the single figure is a diagrammatic view, mainly in section, of a combined brake cylinder and automatic slack adjuster device embodying the invention.

Description

As shown in the drawing, the combined brake cylinder and automatic slack adjuster device comprises a cup-shaped brake cylinder body 1, a non-pressure head 2 secured to the open end of said body, a piston 3 slidably mounted in said body, a piston rod 4 secured at one end to said piston, a hollow rod 5 slidably disposed in a bore in the non-pressure head 2, a slack adjuster take-up mechanism 6 and a slack take-up control member 7. The take-up control member 7 comprises a shaft 8 provided with a longitudinal bore 9 through which projects the piston rod 4 and both terminate at one end within hollow rod 5 which also contains the take-up mechanism 6. The member 7 is provided with a longitudinally extending keyway 10 open to the end of bore 9 adjacent the piston 3 into which projects a dowel 11 carried by rod 4 said dowel being adapted to slide in said keyway and to prevent rotation of said rod with respect to take-up control member 7. A shoulder 12 is formed on piston rod 4 near one end to engage one end of take-up control member 7, as shown in the drawing, to thereby limit movement of piston rod 4 with respect to take-up control member 7 in the direction of the left hand.

The take-up mechanism 6 comprises a plurality of sets of slack adjuster fingers spaced around the axis of rod 4 and each set comprises two bell cranks 13 and 14. Bell cranks 13 are each pivoted on a pin 15 carried by a lug 16 formed on the end of take-up control member 7 most remote from piston 3. One arm 17 of each bell crank 13 is in the form of a pawl for engaging one of a series of teeth 18 formed on the interior wall of hollow rod 5 at any desired pitch. The angle between the sides of the teeth 18 is preferably 90° and said teeth constitute a part of a helical screw-thread to permit rotation of hollow rod 5 with respect to pawl 17 of the take-up mechanism 6 in a manner and for a purpose which will be hereinafter explained. Bell cranks 14 are each pivoted on a pin 19 carried by a lug 20 formed on the end of piston rod 4 opposite to piston 3. One arm 21 of each bell crank 14 is in the form of a pawl for engaging one of the teeth 18. Each of the bell cranks 13 and 14 is so designed that when mounted on its pivot and rotated to a position in which the outer end of arms 17 and 21 of the respective bell cranks engage teeth 18, an arm 22 of bell crank 13 and an arm 23 of bell crank 14 will be disposed in a spaced apart substantially parallel relationship in which said arms 22 and 23 extend in opposite directions from their respective pivots. A tension spring 24 is connected to each of arms 21 and 22 to bias the ends of arms 17 and 21 into engagement with teeth 18 and to pull bell cranks 13 and 14 toward each other until shoulder 12 on piston rod 4 engages take-up control member 7. The length of arms 23 is so chosen as to provide a slight clearance space 25 between arms 17 and 23, the width of the space being such that when the lower side of arm 17 engages the adjacent end of arm 23, under certain brake operating conditions which will be hereinafter described, arm 17 will not be permitted to ratchet over a tooth 18 of hollow rod 5.

The non-pressure head 2 has a portion 26 extending into cylinder body 1 beyond a bolting flange 27 engaging the open end of said body and through the medium of which said non-pressure head is secured to said body by means of cap screws 28. Portion 26 has an inturned flange 29 at its inner end encircling take-up control member 7. Take-up control member 7 is provided on one side of flange 29 with a collar 30 adapted to engage said flange to limit movement of said control member relative to non-pressure head 2 in the direction of the left hand. The length of take-up control member 7 is so chosen that its left hand end will be disposed a short distance from the right hand face of piston 3 when shoulder 12 of piston rod 4 contacts the right hand end of said control member, as shown in the drawing, the purpose of this being hereinafter brought out. On the left hand end of take-up control member 7, disposed at the left hand side of flange 29, is a collar 31 which, with collar 30 engaging one side of flange 29, is adapted to be spaced from the opposite side of said flange a distance substantially equal to desired travel of piston 3 from a brake release position in which it is shown in the drawing, for effecting an application of brakes.

Disposed between flange 27 of non-pressure head 2 and one side of piston 3 is a return spring 32 for biasing said piston, piston rod 4, take-up control member 7, and hollow rod 5 to their brake release position in which they are shown in the drawing. At the opposite side of piston 3 is a pressure chamber 33 to which fluid under pressure is adapted to be supplied through a conduit 34 from a suitable source such as the reservoirs of the well known AB valve (not shown).

A link 35 having a clevis 36 at each end is provided for connecting hollow rod 5 to a brake lever 37 by means of pins 38 and 39.

A link 40 having a clevis 41 at one end is connected to lever 37 to provide a means of applying the brakes by hand whenever this is desired.

Operation

In operation, let it be assumed that chamber 33 is void of fluid under pressure and that the parts of the combined brake cylinder and slack adjuster device are in their brake release position in which they are shown in the drawing.

When fluid under pressure is supplied to chamber 33 to effect an application of brakes, piston 3 will be displaced in the direction of the right hand against the force of release spring 32 and thereby compress said spring. As piston 3 is displaced in the direction of the right hand, the rigid connection between said piston and hollow rod 5 provided by the engagement of arms 21 carried by piston rod 4 with teeth 18 causes said hollow rod to be displaced in the same direction. Springs 24 connected to arms 21 and 22 exert a force on bell cranks 13 in a direction to cause arms 17 to be forced into engagement with teeth 18, whereupon springs 24 and hollow rod 5, which are both being displaced in the direction of the right hand at this time, exert a force through bell cranks 13 on pins 15 to pull take-up control member 7 in the direction of the right hand so that said control member substantially moves simultaneously with piston 3 and hollow rod 5. Hollow rod 5 by reason of its connection with brake lever 37 through link 35 is thus rendered effective to rock said lever and apply a braking force to brake shoes (not shown) for effecting an application of brakes in the well known manner.

As has been explained hereinbefore, the distance between collar 31 and flange 29, with piston 3 and piston rod 4 in their brake release position in which they are shown in the drawing, is the same as the desired normal movement of piston 3 required to effect an application of brakes. Therefore, when the slack in the brake rigging is not excessive, the brake shoes will engage the vehicle wheels (not shown) at substantially the same time that collar 31 engages flange 29.

In order to maintain the brake shoes forced against the wheels as the shoes wear away, lever 37 will rock in a counter-clockwise direction about a pivot (not shown) above the pin 39 and the piston 3 will move further toward the right hand to compensate for such wear, and such movement of said piston will be relative to take-up control member 7 which at this time will be held against movement by collar 31 engaging flange 29. With take-up control member 7 thus held against movement, piston 3, piston rod 4, bell cranks 14 and hollow rod 5 will continue to move in the direction of the right hand as the brake shoes wear. This additional movement of piston 3, piston rod 4, bell cranks 14 and hollow rod 5 relative to member 7 is effective to increase the distance 25 between the bell crank arms 23 and pawl 17 to a degree to permit one or more of the teeth, depending upon the amount of brake shoe wear and pitch of said teeth to ratchet over said pawl. The maximum amount of slack that can be taken up upon each brake applying operation of the brake cylinder device is equal to the distance between piston 3 and collar 31 at the time the shoes first contact the wheel treads, which distance is the same as when piston 3 and take-up control member 7 occupy their release position in which they are shown in the drawing, since when said piston contacts collar 31 which in turn is in contact with the portion 29 of the non-pressure head, further movement of said piston will be prevented. In actual use there will seldom if ever be sufficient slack developed during a brake application to permit piston 3 to contact the collar 31.

Upon a subsequent release of fluid under pressure from chamber 33 for effecting a release of brakes, release spring 32 will move piston 3 and piston rod 4 in the direction of the left hand toward their release position. Piston rod 4 as it moves in the direction of the left hand toward release position carries with it bell cranks 14. If the resistance of the brake rigging to movement to brake release position is great enough to overcome the tension of springs 24, which act to bias arms 21 in a direction to engage teeth 18, hollow rod 5 will remain stationary at this time. Therefore, as piston rod 4 and bell cranks 14 move in the direction of the left hand, under the force of spring 32 acting on piston 3 the pawls 21 will ratchet over one or more teeth 18, corresponding to the number of said teeth which ratchet over pawl 17 while the brakes were applied, until shoulder 12 on said piston rod engages take-up control member 7. Upon shoulder 12 engaging take-up control member 7, further ratcheting of arms 21 over teeth 18 is prevented and further movement of piston rod 4 in the direction of the left hand carries with it the take-up control member 7 and hollow rod 5 until collar 30 engages flange 29, hollow rod 5 becoming rigidly connected to take-up control member 7 and piston rod 4, by arms 17 and 21 and springs 24, upon shoulder 12 engaging take-up control member 7.

The engagement of collar 30 with flange 29 limits movement of piston 3, piston rod 4, take up control member 7 and hollow rod 5 in the direction of the left hand and defines a release position which has been hereinbefore explained.

In the foregoing description it has been explained that as the brake shoes wear while a brake application is in effect, hollow rod 5 and piston rod 4 are moved in the direction of the right hand and arm 17 is ratcheted over one or more teeth 18 and that upon a subsequent release of brakes, piston rod 4 is first moved in the direction of the left hand, ratcheting arm 21 over teeth 18 until shoulder 12 engages the take-up control member 7. Accordingly it is evident that upon piston 3 and piston 4 again reaching their brake release position, hollow rod 5 will remain displaced out of non-pressure head 2 in the direction of the right hand, as compared to the displacement before the application of brakes, an amount equal to the wear of the brake shoes occurring during the brake application, whereby upon a subsequent application of brakes movement of hollow rod 5 with respect to the stationary non-pressure head 2 will rock lever 37 in a counter-clockwise direction further and thus apply the brakes with substantially the same stroke of piston 3 as when said brake shoes were new. Thus the position of the various parts of the brake rigging is adjusted to compensate for brake shoe wear or slack developing in the rigging wherever such slack equals substantially the pitch of teeth 18.

If for any reason there is insufficient resistance in the brake rigging to cause arms 21 to ratchet over teeth 18 when piston 3 returns toward its release position, as explained above, hollow rod 5 will be moved in the direction of the left hand together with piston rod 4 and take-up control member 7, without arm 21 ratcheting over teeth 18, until collar 30 on take-up control member 7 comes into contact with the right hand face of flange 29 which will prevent further movement of said take-up control member 7 and said hollow rod in this direction. With take-up control member 7 and hollow rod 5 stationary, the force of release spring 32 still being effective on piston 3, will then force said piston and piston rod 4 further in the direction of the left hand relative to member 7 until shoulder 12 engages take-up control member 7. This movement of piston rod 4 relative to take-up control member 7 and hollow rod 5, after said hollow rod and said member have been brought to rest, is effective to ratchet arms 21 over teeth 18 until shoulder 12 engages take-up control member 7. Upon shoulder 12 engaging take-up control member 7, piston 3 and piston rod 4 will be in their release position in which position they are shown in the drawing. Collar 30 on take-up control member 7 thus, when effecting a release of brakes, limits movement of said member in the direction of the left hand, after which release spring 32 is effective to cause ratcheting of arms 21 over teeth 18 until piston 3 is returned to its release position.

If for any reason fluid under pressure cannot be supplied to chamber 33 to effect a brake application in the usual manner, a brake application may be effected by applying a manual braking force to link 40 through a hand braking means (not shown). Upon the application of a manual braking force acting in the direction of the right hand on link 40, lever 37 will be rocked in a counter-clockwise direction to apply the brakes. Rocking of lever 37 in a counter-clockwise direction is effective to move link 35 and hollow rod 5 in the direction of the right hand. Movement of hollow rod 5 in the direction of the right hand is effective to rock bell cranks 13 and 14 in a clockwise direction about pins 15 and 19 against the force of springs 24 until arms 17 of cranks 13 engage the ends of arms 23 of bell cranks 14. The normal clearance space 25 between the ends of arms 23 and the lower side of arms 17 is not sufficient to permit bell cranks 13 to be rocked to a position in which the ends of arms 17 will clear teeth 18. Accordingly, after bell cranks 13 have been rocked to a position in which arms 17 engage the ends of arms 23, further movement of hollow rod 5 in the direction of the right hand is effective through arms 17 and 23 to pull or drag the take-up control member 7, piston rod 4 and piston 3 in the direction of the right hand until the brake shoes engage the wheels and a brake application is effected.

If, while a manual brake application is in effect, the brake shoes wear, the take-up mechanism 6 is ineffective to compensate for said wear since no force is effective on piston 3 to operate said mechanism. Accordingly, upon the release of the manual brake application, release spring 32 will move piston 3, piston rod 4, hollow rod 5, take-up control member 7 and take-up mechanism 6 to the same position they occupied prior to said application. A manual brake application will be made very infrequently and it is not essential that slack be taken up during said application. Whatever slack that develops during a manual brake application will however be taken up at the time a subsequent application of brakes is made by fluid under pressure.

When worn brake lining or brake shoes are replaced by new linings or shoes, it is necessary to reset the slack adjuster until, with piston 3 in its release position, the proper clearance is obtained between the shoes and the tread of the wheels. To reset the slack adjuster, link 35 is disconnected from hollow rod 5 by removing pin 38 from the clevis 36 connecting said hollow rod and said link whereupon said hollow rod may be rotated with respect to take-up mechanism 6 to advance said hollow rod 5 into non-pressure head 2 until, upon reconnecting said hollow rod and said clevis, the proper clearance is obtained.

The mechanism being thus adjusted is now in condition for operation to control braking and to take up slack in the manner hereinbefore described.

*Summary*

It will now be seen that I have provided a combined brake cylinder and automatic slack adjuster device in which the slack adjuster is completely enclosed within the hollow rod of the brake cylinder. The mechanism of the slack adjuster is thus protected from snow, ice, dirt and grease which thereby insures very efficient operation.

Having now described the invention, what I claim as new and desire to secure by Letters Patent is:

1. A combined brake cylinder and slack adjuster device comprising a casing, a piston slidably mounted in a bore in said casing, a piston rod secured at one end to said piston, a non-pressure head secured to said casing, a hollow brake applying rod having ratchet teeth formed on the interior wall thereof and slidably mounted in a bore in said non-pressure head, a flange formed at the end of said non-pressure head adjacent said piston, a hollow take-up control member surrounding said piston rod, two spaced stops carried by said member one on each side of said flange to permit a chosen amount of movement of said member relative to said rod, a third stop carried by said piston rod arranged to cooperate with one end of said member to limit movement in one direction of said rod relative to said member, a first pawl carried by said member for engaging said teeth, a second pawl carried by said piston rod for engaging said teeth, spring means for biasing said pawls into engagement with said teeth and said third stop into engagement with said member, and means operative upon movement of said piston in one direction relative to said member more than said chosen amount to cause ratcheting of said first pawl with respect to said teeth and upon subsequent movement in the opposite direction, to ratchet said second pawl with respect to said teeth.

2. A combined brake cylinder and slack adjuster device comprising a casing, a piston slidably mounted in a bore in said casing, a piston rod secured at one end to said piston, a first stop carried by said piston rod adjacent its end most remote from said piston, a non-pressure head secured to said casing and having a longitudinal bore, a flange formed on said head at the end of said bore adjacent said piston, a hollow brake applying rod slidably disposed in said longitudinal bore and having ratchet teeth formed on the interior wall thereof, a hollow take-up control member surrounding said piston rod and encircled by said flange, a second and a third stop carried by said member and disposed one on each side of said flange to limit movement of said member relative to said flange to a chosen amount, a first pawl carried by said member for engaging said teeth, a second pawl carried by said piston rod, a first spring means for biasing said pawls into engagement with said teeth, a second spring means for biasing said first stop into engagement with said member and said second stop into engagement with said flange, and means operative upon movement of said piston in excess of said chosen amount in a direction to oppose the force of said second spring means to ratchet said first pawl with respect to said teeth and upon subsequent movement of said piston in the opposite direction to ratchet said second pawl with respect to said teeth an amount equal to said first mentioned ratcheting.

3. A combined brake cylinder and slack adjuster device comprising a casing, a piston slidably mounted in a bore in said casing, a piston rod secured at one end to said piston, a first stop carried by said piston rod adjacent its end most remote from said piston, a non-pressure head secured to said casing and having a longitudinal bore, a flange formed on said head at the end of said bore adjacent said piston, a hollow brake applying rod slidably mounted in said bore and having ratchet teeth formed on the interior wall thereof, a hollow take-up control member surrounding said piston rod and encircled by said flange, a second and a third stop carried by said member and disposed one on each side of said flange to limit movement of said member relative to said flange to a chosen amount, means carried by said piston rod for causing movement of said hollow rod with said piston rod upon movement of said piston rod in one direction, and operative to effect ratcheting of said piston rod relative to said hollow rod upon movement of said piston rod in the opposite direction subsequent to movement of said piston rod in said one direction in excess of said chosen amount, means carried by said take-up control member for causing movement of said hollow rod with said take-up control member upon movement of said take-up control member in the opposite direction subsequent to movement of said piston rod in said one direction an amount greater than said limited movement of said take-up control member, and spring means for biasing said first stop into engagement with said take-up control member and said second stop into engagement with said flange.

4. A combined brake cylinder and slack adjuster device comprising a casing, a piston slidably mounted in a bore in said casing, a piston rod connected at one end to said piston, a non-pressure head secured to said casing and having a longitudinal bore, a flange formed on said head at the end of said bore adjacent said piston, a hollow brake applying rod slidably mounted in said bore and having ratchet teeth formed on the interior wall thereof, and a slack adjuster mechanism enclosed in said hollow rod, said mechanism comprising a first pawl carried by said piston rod, a hollow take-up control member surrounding said piston rod and encircled by said flange, two stops carried by said control member and disposed one on each side of said flange to limit movement of said control member relative to said flange to a chosen distance, a second pawl carried by said control member, spring means operative to bias both of said pawls into engagement with said teeth, and means operative to effect ratcheting of said second pawl relative to said teeth upon movement of said piston in one direction a distance greater than said chosen distance and to effect ratcheting of said first pawl relative to said teeth upon subsequent movement of said piston in the opposite direction.

5. A combined brake cylinder and slack adjuster device comprising a casing, a piston slidably mounted in a bore in said casing, a piston rod connected at one end to said piston, a non-pressure head secured to said casing and having a longitudinal bore, a flange formed on said head at the end of said bore adjacent said piston, a hollow brake applying rod slidably mounted in said bore and having ratchet teeth formed on the interior wall thereof, and a slack adjuster mechanism enclosed in said hollow rod, said mechanism comprising a first pawl carried by said piston rod, a hollow take-up control member surrounding said piston rod and encircled by said flange, two stops carried by said control member and disposed one on each side of said flange to limit movement of said control member relative to said flange to a chosen distance, a second pawl carried by said control member, spring means operative to bias both of said pawls into engagement with said teeth, means operative to effect ratcheting of said second pawl relative to said teeth upon movement of said piston in one direction a distance greater than said chosen distance, and means operative to positively insure ratcheting of said first pawl relative to said teeth upon subsequent movement of said piston in the opposite direction irrespective of the resistance to movement of said hollow rod in said opposite direction.

6. A combined brake cylinder and slack adjuster device comprising a casing, a piston slidably mounted in a bore in said casing, a piston rod connected at one end to said piston, a non-pressure head secured to said casing and having a longitudinal bore, a flange formed on said head, a hollow brake applying rod slidably mounted in said longitudinal bore and having ratchet teeth formed on the interior wall thereof, and a slack adjuster mechanism enclosed in said hollow rod, said mechanism comprising a hollow movable member surrounding said piston rod, two stops carried by said member for limiting movement of said member in each direction relative to said flange, a plurality of bell cranks mounted on said member, one arm of each of said bell cranks comprising a pawl for engaging said teeth, a plurality of bell cranks mounted on the end of said piston rod remote from said piston, one arm of the last mentioned bell cranks comprising a pawl for engaging said teeth and the other arm arranged in a position relative to said one arm to be at right angles to said one arm of said first mentioned bell cranks upon said one arm of said second mentioned bell cranks engaging said teeth, spring means for biasing said one arm into engagement with said teeth and said other arms of said second mentioned bell cranks in the direction of said one arms of said first mentioned bell cranks, a stop carried by said piston rod to limit movement of said other arms in the direction of said one arms to provide a chosen clearance space therebetween upon said one arms engaging said teeth, said clearance space being insufficient to permit said one arms of the first named bell cranks to ratchet with respect to said teeth, means for effecting ratcheting of said pawls of said first mentioned bell cranks with respect to said teeth upon said piston moving in one direction a distance greater than the limited movement permitted said hollow movable member, and means for effecting ratcheting of said pawls of said second mentioned bell cranks with respect to said teeth upon subsequent movement of said piston in the opposite direction.

7. A combined brake cylinder and slack adjuster device comprising a casing, a brake applying piston having a normal piston travel for applying brakes, a piston rod connected at one end to said piston, a first stop carried by said piston rod adjacent its end opposite said one end, a non-pressure head secured to said casing and having a bore, a flange formed on said head, a hollow brake applying rod slidably mounted in said bore and having ratchet teeth formed on the interior wall thereof and a slack adjuster mechanism enclosed in said hollow rod, said mechanism comprising a hollow member surrounding said piston rod and disposed between said piston and said first stop, a second and a third stop each carried by said member and so spaced on opposite sides of said flange as to permit movement of said member relative to said flange a distance equal to said normal piston travel, a first pawl carried by said hollow member, a second pawl carried by said piston rod, spring means operative to bias said pawls into engagement with said teeth, said pawls and spring means being cooperative to effect simultaneous movement of said piston, piston rod, hollow rod, and hollow member said distance in one direction and cooperative to permit additional movement of said piston, piston rod and hollow rod relative to said hollow member to ratchet said first pawl relative to said teeth on said hollow rod, and spring means cooperative with said second pawl and said first mentioned spring means to move said piston in the opposite direction subsequent to said first mentioned movement to cause said second pawl to ratchet relative to said teeth.

8. In a combined brake cylinder and slack adjuster device, the combination of a hollow rod having internally ratchet teeth and movable in one direction to effect an application of brakes, and in the opposite direction to effect a release of brakes, a driving means comprising a piston and a piston rod, said rod being secured at one end to said piston, a hollow measuring element surrounding said piston rod, means carried by said piston rod and engaging said measuring element to inhibit rotation of said measuring element with respect to said piston rod, stop means for limiting movement of said measuring element relative to said piston rod, a driving pawl carried by said piston rod for engaging one of said teeth, a locking pawl carried by said measuring element for engaging another one of said teeth, means for effecting movement of said piston in said one direction a limited distance greater than said limited movement to ratchet said hollow rod relative to said locking pawl, and means for effecting subsequent movement of said piston in said opposite direction to ratchet said driving pawl relative to said hollow rod.

CECIL S. KELLEY.

REFERENCES CITED

The following references are of record in the file of this patent:

UNITED STATES PATENTS

| Number | Name | Date |
|---|---|---|
| 1,479,700 | Djurson | Jan. 1, 1924 |
| 1,749,018 | Campbell | Mar. 4, 1930 |
| 1,801,854 | Farmer | Apr. 21, 1931 |
| 1,936,530 | Taylor | Nov. 21, 1933 |

FOREIGN PATENTS

| Number | Country | Date |
|---|---|---|
| 679,038 | France | Apr. 8, 1930 |
| 512,965 | Germany | Nov. 6, 1930 |